United States Patent [19]
Rockwood et al.

[11] Patent Number: 5,251,160
[45] Date of Patent: Oct. 5, 1993

[54] SYSTEM FOR BLENDING SURFACES IN GEOMETRIC MODELING

[75] Inventors: Alyn P. Rockwood, Moss Beach, Calif.; John C. Owen, Cambridge, United Kingdom

[73] Assignee: Evans & Sutherland Computer Corporation, Salt Lake City, Utah

[21] Appl. No.: 750,690

[22] Filed: Aug. 27, 1991

Related U.S. Application Data

[63] Continuation of Ser. No. 509,695, Apr. 16, 1990, abandoned, which is a continuation of Ser. No. 159,612, Feb. 23, 1988, abandoned.

[51] Int. Cl.⁵ .................................................. G06F 15/68
[52] U.S. Cl. ..................................... 364/578; 395/142; 395/143
[58] Field of Search ................ 364/512, 514; 358/133, 358/163; 340/728, 729, 730; 382/54, 55; 395/155, 141, 118, 120, 119, 142, 143

[56] References Cited

U.S. PATENT DOCUMENTS

| | | | |
|---|---|---|---|
| 4,598,372 | 7/1986 | McRoberts | 364/514 |
| 4,730,261 | 3/1988 | Smith | 395/122 |
| 4,777,620 | 10/1988 | Shimoni et al. | 382/56 |
| 4,785,399 | 11/1988 | Evans et al. | 395/156 |
| 4,791,583 | 12/1988 | Colburn | 395/120 |
| 4,855,939 | 8/1989 | Fitzgerald, Jr. et al. | 395/119 |
| 4,868,766 | 9/1989 | Oosterholt | 395/120 |

*Primary Examiner*—Thomas G. Black
*Assistant Examiner*—Michael Zanelli

[57] ABSTRACT

A computer-aided design system and a process generates a graphic display of a blend between a plurality of geometric primitive shapes including other blends. An interactive terminal controls a geometric modeler to generate and modify visual graphic displays of primitive geometric shapes at a display screen of the interactive terminal. Logic structures generate both a blend and blends. Each logic structure is implemented with an individual distinct blending algorithm to accomplish a localized superelliptical blend and blends according to user selections including: a plurality of geometric primitive shapes to be blended, a blend operation, and a blend function. A memory, registers and gates in the system store and manage data.

14 Claims, 2 Drawing Sheets

SYSTEM FOR BLENDING SURFACES IN GEOMETRIC MODELING

This is a continuation of application Ser. No. 509,695, filed Apr. 16, 1990, now abandoned, which is a continuation of Ser. No. 159,612, filed Feb. 23, 1988, and entitled "A System For Blending Surfaces In Geometric Modeling", now abandoned.

BACKGROUND AND SUMMARY OF THE INVENTION

A blending surface, or blend, is a smooth transitional surface between a plurality of combined geometric primitive shapes. In geometric modeling systems, a form of a computer-aided design system, primitive shapes are combined by the use of Boolean set operations, e.g. union, intersection and difference, to construct more complex geometric objects for graphic display or manufacture. For example, a designer using a geometric modeler and simple geometric primitive shapes such as spheres, toroids, and cylinders can create a graphic display or a tape for controlling a milling machine to produce complex geometric objects such as automobile engine parts, tools, or molds. Useful analysis may also be performed in relation to objects.

In geometric modeling systems a need exists for blends, especially those created between a plurality of geometric primitive shapes including those using other blended surfaces as geometric primitive shapes. Such blends are essential in many areas of design and manufacturing. For example, blends are important in mechanical design for several reasons including dissipating stress concentrations, enhancing fluid flow and improving esthetics.

To consider detailed examples, certain manufacturing processes are incompatible with sharp edges and corners. Specifically, in a high pressure injection mold, sharp interior edges and corners define weak points. Under the high pressure of injected molding material, the mold may fracture due to the stresses at unblended edges and corners. Consequently, the capability to design a mold with blended surfaces is important in providing structure to withstand the stresses induced by a high pressure molding material.

In another application, blended surfaces can be used to smooth out harsh edges or create smooth surfaces in objects operating in fluid environments or can be used to create more useful or attractive contoured shapes. In any event, a need exists for an effective, economical geometric modeling system capable of generating blending surfaces.

Generally, the utility of a computer-aided design system is related to the complexity of objects it can model. Geometric modeling systems generate graphic displays and other modeling operations of complex geometric objects for use in industrial design and manufacturing. Conventional geometric modeling systems are somewhat limited in their ability to blend a plurality of geometric primitive shapes, a procedure that may involve generating blends on blends. In this regard, an article, "Blending Surfaces in Solid Modeling" by Alyn P. Rockwood and John C. Owen, *Geometric Modeling; Algorithms and New Trends*, at 367 to 383 (G. Farin ed. 1987), considers a method for generating simple blends between previously unblended geometric primitive shapes. The article also mentions a conceptual framework for generating blends on blends. Neither the article nor other known art fully addresses the problem of blends on blends. Yet such blends are important in blending a plurality of geometric primitive shapes. Consequently, the problem of blends on blends has been a limiting factor in the development and utility of traditional geometric modeling systems for some applications.

In general, the present invention enables a user to create a blending surface between a plurality of geometric primitive shapes. The blending surface is generated substantially in accordance with user selections for graphic display. More specifically, the present invention comprises a computer graphics system capable of generating a graphic display or production of a blending surface between a plurality of geometric primitive shapes including blends. Also, analysis may also be accomplished in relation to models. An interactive terminal controls a geometric modeler to generate and modify visual graphic displays of primitive geometric shapes at the display screen of the interactive terminal. Logic structure, in accordance with the present invention, generates a blending surface between a plurality of geometric primitive shapes substantially in accordance with user selections. A memory, registers and gates are provided in the system for data storage and management.

DESCRIPTION OF THE ILLUSTRATIVE EMBODIMENT

A detailed illustrative embodiment of the present invention is disclosed herein; however, it is merely representative, recognizing user interfaces, geometric modelers, memory devices, processing devices and programming may be embodied in a wide variety of forms, some of which may be quite different from those of the disclosed embodiment. Consequently, the specific structural and functional details disclosed herein are merely representative, yet in that regard they are deemed to afford the best embodiment for purposes of disclosure to afford a basis for the claims herein which define the scope of the present invention.

Initially, it will be helpful to consider some aspects of traditional geometric modeling systems as related to the present development. In a geometric modeling system of the type disclosed herein, geometric primitive shapes are defined by mathematical functions that describe the zero surfaces of the shapes. Accordingly, the geometric modeling system utilizes these functions to generate graphic displays of the geometric primitive shapes.

The present system defines geometric primitive shapes implicitly. That is, in the system, a geometric primitive shape $P_i$ is defined as an implicit function by $P_i:R^n \to R$ where $P_i=0$. Thus, for example, a zero surface for a unit sphere is given by $P:R^3 \to R$; $P(x,y,z)=x^2+y^2+z^2-1=0$. In this notation, an index tag i identifies the particular geometric primitive shape. For example, different geometric primitive shapes (perhaps of the same shape and size but at different locations in space, e.g. two unit spheres A and B) are distinguishable by the index tag i (specifically as by subscripts A and B). Accordingly, the zero surface of a sphere A may be denoted $P_A$ and the zero surface of a sphere B may be denoted $P_B$.

As can be seen from the above example, implicit functions are of a form which is relatively easy to define using the above notation. To generate the zero surface of a geometric primitive shape $P_i$, the geometric modeling system evaluates a series of points in an interactive fashion to determine the values for which the function is equal to zero. Subsequently, the zero surface of the geometric primitive shape $P_i$ can be graphically displayed. This graphic display of the geometric primitive shape $P_i$ is a picture of that particular geometric primitive shape in a two or quasi-three dimensional context easily recognizable by a user. For example, the unit spheres referred to above might be graphically displayed to the user as shaded objects or in hidden line representation to communicate to the user the relative size and position of the spheres in space.

Figure 1:
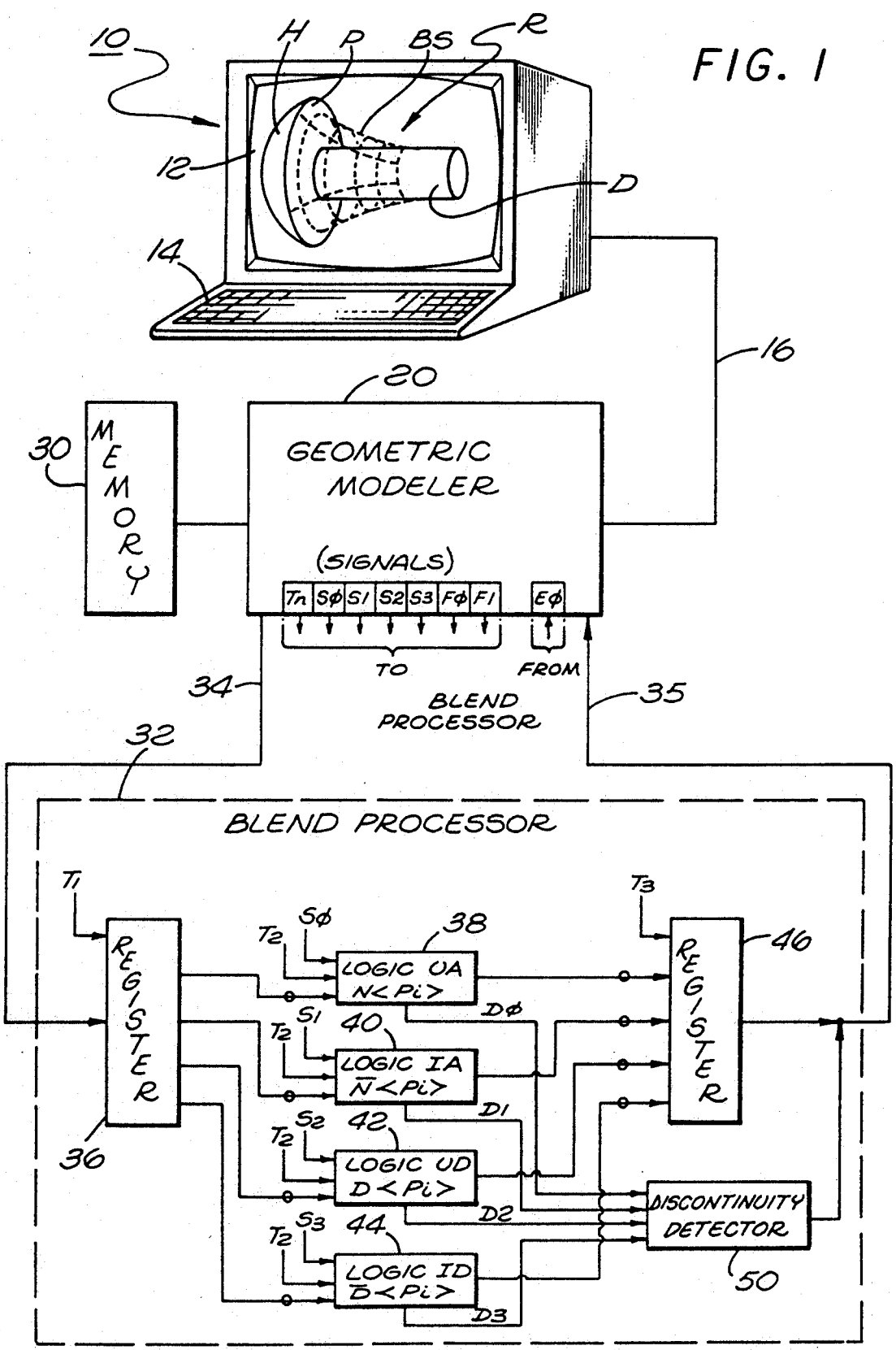
FIG. 1 is a block diagram of the system in accordance with the present invention.

Referring initially to FIG. 1, a geometric modeling system incorporating the present development is illustrated. An interactive terminal 10 includes a display screen 12 and a keyboard 14. Of course, various forms of terminals suitable for use as an interactive graphics terminal are well known.

The terminal 10 communicates with a central processor in the form of a geometric modeler 20 (FIG. 1, center). The modeler 20 also communicates with a memory 30 and a blend processor 32. In one embodiment, the terminal 10, the modeler 20 and the memory 30 comprise elements of a geometric modeling computer system as the ROMULUS system developed and marketed by Evans & Sutherland Computer Corporation of Salt Lake City, Utah.

The modeler 20 is connected to the blend processor 32 by an input bus 34 and an output bus 35. The processor 32 includes components for generating a blending surface according to user selections and in cooperation with the rest of the system.

In the processor 32, the input bus 34 is connected to a first register 36, in turn connected to the input of logic structures 38, 40, 42 and 44. Each logic structure implements an individual distinct algorithm to generates a localized superelliptical blending surface according to a specific set of user selections.

The outputs of the logic structures 38, 40, 42 and 44 are connected individually to a second register 46. In addition, the logic structures 38, 40, 42 and 44 are connected to discontinuity detector 50. Outputs from the detector 50 and the second-register 46 are connected to the output bus 35 that connects the processor 32 to the modeler 20.

The blend processor 32 is interactively controlled by the terminal 10 via the modeler 20. The processor 32, in response to user commands, signals and data from the modeler 20, generates blending surfaces between elements to provide a graphic display as pictured on the screen 12. Such a display is illustrated by a rivet R including a blending surface, BS. Further, in accordance herewith, the generated blending surfaces become graphic visual elements defined in the system under the command of the terminal 10 and the blending surfaces may be used in other modeling operations, including further blending. Thus, the processor 32 is capable of generating a blending surface comprised of a plurality of geometric primitive shapes or comprised of a blend which is itself part of another blend.

For example, the rivet R is composed of three geometric primitive shapes, a sphere S, a halfspace H (term of art for a volume to define the rivet head P by severing the sphere S) and a rod D. The zero surface of the rivet R (comprising the graphic display) generally corresponds to the intersection between the sphere S and the halfspace H (defining the head or hemisphere P by intersection, $\cap$) and the union (u) of the rod D. Thus, as well known in the art, an intersection $\cap$ is an "and" logic operation while a union U is an "or" logic operation.

Specifically, the cooperative operation of the blend processor 32 enables graphic displays of blended complex objects. Thus, the system is capable of generating a blending surface for graphic display or use in other modeling operations as, for example, further blending, or making of milling tapes of the blend or blended object for use in milling machines, or determining the weight, center of gravity, or fit of the blend or the blended object. For example, a blending surface BS, shown in dotted lines, is included in the display of the rivet R between the head P and the rod D. As shown, the blending surface BS forms a smooth localized superelliptical transitional surface between the halfspace H and the rod D. Blending surfaces in the system are implicitly defined. This is a factor that enables the system to utilize the blending surfaces it generates in other modeling operations. It should be noted that the defined rivet R and the blending surface BS also may be termed geometric primitive surfaces when included in other modeling operations.

Using the $P_i$ notation described earlier, the implicit functions that define the zero surfaces of the geometric primitive shapes shown in FIG. 1 may be noted as follows: $P_S$=sphere S; $R_H$=halfspace H; and $P_D$=rod D. Further, the implicit functions that define the zero surface of the rivet R and the blending surface BS respectively may be noted $P_R$ and $P_{\overline{BS}}$, respectively. Using this notation, the rivet R, i.e. $P_R$, as defined above may concisely be expressed in the form: $P_R = (P_S \cap P_H)$ U $P_D$, or a combination of the intersection of the sphere S and the halfspace H in union with the rod D. In the expression, "U" corresponds to the Boolean set operation union, "$\omega$" designates intersection $P_H$ indicates the halfspace, $P_D$ is the rod, and the parentheses indicate the order of primitives as they would in a typical mathematical operation. The order of primitives corresponds to the order in which the geometric primitive shapes $P_S$, $P_H$ and $P_D$ are assembled to form the complex geometric object $P_R$ (rivet R). Similarly, the blending surface BS (between the hemisphere H and the rod D, FIG. 1), i.e. object $P_{BS}$, may be expressed in the above notation with the conventional angle brackets (surface designating) represented herein as < and > to accommodate available print. Specifically, the blending surface $P_{BS} = N < P_H, P_D >$. This notation describes a blending surface, $P_{BS}$, that forms an added metal blend third surface BS between two geometric primitive shapes, namely, $P_H$ (halfspace H) and $P_D$, (rod D).

As shown in FIG. 1, $P_{BS}$, i.e. blending surface BS, is a surface that adds mass to $P_R$, i.e. rivet R, to form the blended complex geometric object illustrated in dashed line on the display 12 (i.e. $N < P_H, P_D >$ with angle bracket notation. It is difficult to picture a "subtracted metal blend" at the inside corner defined between the halfspace H and the rod D, however, merely to indicate the notation with angle brackets, it would be $P_{\overline{BS}} = \overline{N} < P_S, P_H >$. Thus, bar negation designations, e.g. $\overline{N}$ indicate removal of material.

Referring to FIG. 1, logic structures 38, 40, 42 and 44 (FIG. 1) within the blend processor 32 enable the system to generate graphic display of blending surfaces as, for example, blending surface BS (FIG. 1). Specifically, each logic structure embodies an individual distinct blending logic to generate a localize superelliptic blending surface according to user selections comprising the plurality of geometric primitive shapes to blended, the blend operation and the blend function. Accordingly, to generate the blending surface, each logic structure implements its individual distinct blending logic to process input data comprising data regarding geometric primitive shapes to be blended. The processed data output by the logic structures substantially corresponds to the generated blending surface for graphic display or use in other modeling procedures including blending.

Referring to Table 1 below, the logic structures 38, 40, 42 and 44 (FIG. 1) are labeled respectively UA, IA, UD and ID to indicate the specific set of user selections that activates each logic structure (U=union, I=intersection). Included in Table 1 are exemplary activation control signals S0-S3 and corresponding binary codes for each logic structure.

TABLE 1

| Logic Structure Designation | Activation Signal | Binary Equivalent | User Selections |
|---|---|---|---|
| UA (38) | S0 | 00 | Boolean operation: union Blend function: analytic |
| IA (40) | S1 | 01 | Blend operation: intersection Blend function: analytic |
| UD (42) | S2 | 10 | Blend operation: union Blend function: displacement |
| ID (44) | S3 | 11 | Blend operation: intersection Blend function: displacement |

As shown in Table 1, each combination of user selections for blend operation and blend function activates a different logic structure for generating the desired blending surface. As stated earlier, the blend operation refers to the overall shape of the blending surface, i.e. the operation either adds mass to form a convex curved blending surface or subtracts mass to form a concave curved blending surface. On the other hand, the blend function refers to how the logic structures measure the distance from the zero surfaces of the selected geometric primitive shapes to the zero surface of the blending surface. Regardless of the blending function selected, this distance measure is usually non-Euclidean.

The way the blend functions measure the distance between the zero surfaces of the selected geometric primitives and the blending surface affects the shape of the accomplished blending surface and more particularly the shape of blends on blends. In fact, each logic structure 38, 40, 42 and 44 generates a blending surface in the general form of a localized superelliptical surface. However, as shown in Table 2, each logic structure generates a localized superelliptical blending surface with distinct characteristics.

TABLE 2

| Logic Structure | Blending Surface | Characteristics |
|---|---|---|
| UA | $N<P_i>$ | Added metal blend Convex curvature Analytic function |
| IA | $\overline{N}<P_1>$ | Subtracted metal blend Concave curvature Analytic function |
| UD | $D<P_1>$ | Added metal blend Convex curvature Displacement function |
| ID | $\overline{D}<P_i>$ | Subtracted metal blend Concave curvature Displacement function |

The visible differences in a blending surface generated by either the analytic or displacement blending function can be very subtle, albeit significant. For example, the blending surface BS (FIG. 1) would have slight differences depending on the blending function selected by the user to generate it. However, it is notable that the blending surface generated by the analytic blend function often results in a canonical surface, that is part of a quadric or torus, whereas the displacement blending function is quite useful in blending highly complex geometric objects.

As stated above, each logic structure essentially functions to generate a localized superelliptic blending surface for graphic display corresponding to a different set of user selections. Specifically, in the case of the logic structure 38 (FIG. 1), designated UA, a localized superelliptic added metal blend is generated analytically from a plurality of selected geometric primitive shapes. As an example, the blending surface BS is an added metal blend representative of the general shape of a blending surface generated by logic structure 38. Accordingly, again with angle brackets indicated < and >, the logic structure 38 generates the localized superelliptic blending surface $N<P_i>$ from data comprising the geometric primitive shapes to be blended where $N<P_i>$ is defined such that:

$$N<P_i> = R<P_i>\{1-(\Sigma_i Q_i)^{1/t}\}$$

where $$R<P_i> = \Sigma_i(Q_i/\Sigma_i Q_i)R_i$$

and $$Q_i = [i - P_i/R_i]$$

wherein $N<P_i>$ = defines the localized superelliptic blending surface between the selected plurality of geometric primitive shapes, $R<P_i>$ = rescaling function corresponding to a non-Euclidean distance measure of the blending surface from the zero surface of the geometric primitive shape within the bounds of blending surface, $R_i$ = variable range defining the bounds of the blending surface, often constant, $P_i$ = implicit function defining a selected geometric primitive shape indexed by i, t = thumbweight, a constant which determines the degree of curvature of the blending surface, $[*]_+ = \text{Max}(0, *)$, wherein "+" indicates truncation of the blend with the symbol "*" generally representing the contents of the square brackets with a range of from zero to the maximum, such that only the part of the blend lying between the ranges on the selected primitives is generated.

In the case of the logic structure 40, designated IA, a localized superelliptic subtracted metal blend is generated analytically between a plurality of selected primitives. As an example, the hypothetical blending surface Px discussed above would be representative of the general shape of the blending surface generated by logic, structure 40. Accordingly, logic structure 40 generate the blend $\bar{N}<P_i>$ from data comprising the geometric primitive shapes to be blended where $\bar{N}<P_i>$ is defined such that:

$$\bar{N}<P_i> = \bar{R}<P_i>(\Sigma_i \bar{Q}_i)^{1/t} - 1)$$

where $$\bar{R}<P_i> = \Sigma_i(\bar{Q}_i/\Sigma_i \bar{Q}_i)R_i$$

and $\bar{Q}_i = [i + P_i/R]^t$ wherein $\bar{N}<P_i>$ = defines the localized superelliptical blending surface between the selected plurality of geometric primitive shapes, $\bar{R}<P_i>$ = rescaling function corresponding to a non-Euclidean distance measure of the blending surface from the zero surface of the geometric primitive shape within the bounds of blending surface, $R_i$ = variable range defining the bounds of the blending surface, often constant, $P_i$ = implicit function defining a selected geometric primitive shape indexed by i, t = thumbweight, a constant which determines the degree of curvature of the blending surface, $[*]_+$ = Max (0,*) indicates as before, truncation of the blend such that only the part of the blend lying between the ranges on the selected primitives is generated.

The logic structures 38 and 40 accomplish blending surfaces that exhibit several useful characteristics. For example, the "inside-outside" test for determining whether a point in space is inside or outside the blending surface is easily accomplished. The "inside-outside" test is accomplished by plugging the point into the blend function, $N<P_i>$ or $\bar{N}<P_i>$, and evaluating the function. Accordingly, if the result is <zero, then the point is inside the blend; >zero, then the point is outside the blend; =zero, then the point lies on the zero surface of the blend. Further, the distance of the point from the zero surface is the value of the blend function evaluated at the point.

It also should be noted that the blending surface formed by processors is localized. The gradient of the blend function $\bar{N}<P_i>$ or $_N<P_i>$ outside the range of the generated blend is the gradient of the functions of the geometric primitive shapes between which the blend has been generated and, thus, the blend is truncated or local. In addition, the blending surface generated by logic structures 38 and 40 often result in a canonical surface, that is part of a quadric or torus.

The other logic structures 42 and 44 are designed to utilize a displacement method to generate a blending surface between a plurality of geometric primitive shapes. The displacement function allows a blending surface to be generated in situations where other methods have difficulty generating the desired blending surface. For example, often a blending surface cannot be generated between a plurality of geometric primitive surfaces because of a discontinuity in the analytic blend function derivative.

The displacement function provides a solution to this problem. The displacement function eliminates the discontinuity and generates the desired blending surface by displacing the blending surface a non-Euclidean distance from the zero surfaces of the plurality of geometric primitive shapes. This displacement function is incorporated into logic structures 42 and 44.

Logic structure 42 (FIG. 1), designated UD, generates a localized superelliptic added metal blend between a plurality of selected geometric primitive shapes utilizing the displacement method. As an example, blending surface BS (FIG. 1) is an added metal blend representative of the general shape of a blending surface generated by logic structure 42. Accordingly, the logic structure 42 generates the blending surface $D<P_i>$ from data comprising the geometric primitive shapes to be blended where $D<P_i>$ is defined such that:

$$D<P_i> = h$$

where h is the root of $S<P_i-h> = 0$ and $$S<P_i-h> = I - \Sigma_i [I - (P_i-h)/R_i]^t_+ = 0$$

wherein h is the displacement of the blend from a primitive $P_i$, $D<P_i>$ = defines the localized superelliptical blending surface between the selected plurality of geometric primitive shapes, $R_i$ = variable range defining the bounds of the blending surface, often constant, $P_i$ = implicit function defining a selected geometric primitive shape indexed by i, t = thumbweight, a constant which determines the degree of curvature of the blending surface, $[*]_+$ = Max (0,*) indicates truncation of the blend such that only the part of the blend lying between the ranges on the selected primitives is generated.

In the case of the logic structure 44, designated ID, a localized superelliptic subtracted metal blend is generated between a plurality of selected geometric primitive shapes utilizing the displacement method. As an example, the hypothetical blending surface Px discussed above would be representative of the general shape of the blending surface generated by logic structure 44. Accordingly, the logic structure 44 is designed to generate the blending surface $\bar{D}<P_i>$ from data comprising the geometric primitive shapes to be blended wherein $\bar{D}<P_i>$ is defined such that:

$$\bar{D}<P_i> = h$$

where h is the root of $\bar{S}<P_i-h> = 0$, that is, h is a quantity that reduces the equation to zero, using the term "root" as it is traditionally used;

and $$\bar{S}<P_i-h> = \Sigma_i[1+(P_i-h)/R_i]^t_+ - 1 = 0$$

wherein h is the displacement of the blend from a primitive $P_i$, $\bar{D}<P_i>$ = defines the localized superelliptical blending surface between the selected plurality of geometric primitive shapes, $R_i$ = variable range defining the bounds of the blending surface, often constant, $P_i$ = implicit function defining a selected geometric primitive shape indexed by i, t = thumbweight, a constant which determines the degree of curvature of the blending surface,

[* += Max (0,*) indicates truncation of the blend such that only the part of the blend lying between the ranges on the selected primitives is generated.

Among the characteristics of the blending surface generated by the logic structures 42 and 44 are that they are continuous functions that result in smooth surfaces without discontinuities. In addition, Newton's method always converges to h for these functions in the interval of $min(P_i-h)$ to $max(P_i-h)$. Thus, logic structures 42 and 44 allow a blending surface to be generated in cases where logic structures 38 and 40 may encounter discontinuities in generating the blending surface. Computation time utilizing logic structures 42 and 44 for generating the blending surface may take longer than for logic structures 38 and 40. In spite of this, the computation time required for logic structures 42 and 44 to generate the blending surface is still only a small percentage, less than twenty-five percent, of the computation time within the system. Other blending surface characteristics, such as the inside-outside test and localization, are generated in substantially the same way for logic structures 42 and 44 as for logic structures 38 and 40.

In view of the general description of the system shown in FIG. 1, a complete understanding of the improvement therein may now best be generated by assuming certain operating conditions and explaining the resulting consequences concurrently with the introduction of other more specific components of the system. Accordingly, assume that the user using well known techniques of geometric modeling on a geometric modeler, as for example ROMULUS, has constructed a complex geometric object comprising a picture or other visual graphic display, as for example the rivet R.

Further assume the user desires to blend a selected plurality of geometric primitive shapes that comprise the complex geometric object to form a blending surface as, for example, blending surface BS. Accordingly, the user utilizes the interactive capabilities of the system via the terminal 10 thereby communicating to the modeler 20 and activating the blend processor 32. The activation of the blending capabilities of the system may be done in several ways, however, for exemplary purposes assume the user enters a "BLEND" command. The user then makes three selections, he selects the geometric primitive shapes to blend; the blend operation, for example, union or intersection, corresponding to the overall shape of the blend, that is a generally convex or concave shape; and the blend function, for example, analytic or displacement.

To generate the graphic display of the blending surface in accordance with the user selections, electronic signals corresponding to the selections travel from the terminal 10 via the modeler 20 and activate the appropriate logic structure 38, 40, 42 or 44 within the processor 32 to generate the blending surface. In the case of blending surface BS, either logic structure 38 or 42 is activated, Accordingly, timing signals, Tn, are provided by the modeler 20 to coordinate and control the overall operation of the processor 32 and its several components. The generated blending surface is relayed to the modeler 20 where it is displayed at the screen 12.

Considering the operation of the processor 32 in somewhat greater detail, the first register 36 comprises a buffer for input data sent to the processor from the modeler 20 via the input bus 34. Input data includes data regarding the selected geometric primitive surfaces and may include other data such as the order of primitives. In this regard, input data may be stacked in register 36 to be processed substantially in accordance with user selections. A timing signal, T1, from the modeler 20 coordinates and controls operation of the register 36. Further, a flush signal F0, from the modeler 20 clears the contents of register 36 when a blending procedure is completed or for input of fresh data. Alternatively, data may be cleared from the register 36 by input of new data from the modeler 20 via bus 34. In any event, input data for processing by the logic structures 38, 40, 42 or 44 is staged through the register 36.

Each logic structure 38, 40, 42 or 44 is capable of receiving data from the register 36. Accordingly, timing signals, T2, provided from the modeler coordinate and control the operation of the logic structures 38, 40, 42 and 44. In addition, each logic structure is activated by a corresponding activation signal S0, S1, S2 or S3 (Table 1) from the modeler 20 in response to commands from the user via keyboard 14 at the terminal 10. The activated logic structure utilizes the input data to generate the localized superelliptical blending surface according to the individual distinct blending algorithm with which it is programmed.

Accordingly, regardless of which logic structure generates the blending surface, the data corresponding to the blending surface is output to the register 46. The register 46 comprises a buffer for data output from the logic structures 38, 40, 42 and 44. Output data includes data regarding the generated blending surface for graphic display. In this regard, the processed output data may be stacked in the register 46 until needed for generating graphic display of the blending surface or until it is cleared. A timing signal, T3, from the modeler 20 coordinates and controls the operation of the register 32. Further, a flush signal F1 from the modeler clears the contents of register 46 when the blending surface is graphically displayed or for the input of fresh data. Alternatively, data may be cleared from the register 46 by input of fresh data from the logic structures 38, 40, 42 and 44 or the modeler 20. In any event, processed data from the logic structures 38, 40, 42 and 44 is staged through the register 46.

Accordingly, output data is transferred through the output bus 35 of the blend processor 32 (FIG. 1). The output bus 35 is connected to the modeler 20 to enable the system to utilize the freshly generated blending surface in other modeling procedures, including blending procedures and graphic display. The detector 50 monitors the operation of the logic structures 38, 40, 42 and 44 via lines D0, D1, D2 and D3 to detect discontinuities in the blending surface as it is being generated. In the event a discontinuity is detected, the error signal E0 is relayed to the modeler 20 via output bus 35. The modeler 20 relays information regarding the flagged error condition to the terminal 10 to provide a visual indication on the screen 12. At that time, the user may modify his selections via the keyboard 14 to alleviate the error condition that gave rise to the error signal E0. This may include modifying the selections so that another logic structure is utilized to generate the blending surface as, for example, generating the blending surface via the logic structure 42, designated UD, rather than the logic structure 38, designated UA.

Thus, the system can generate graphic displays and other modeling procedures, including further blending, utilizing the freshly generated blending surface. For example, the blending surface BS can be displayed as shown in FIG. 1 and/or also utilized as a geometric primitive shape in a wide variety of other modeling procedures, including further blending.

Figure 2:
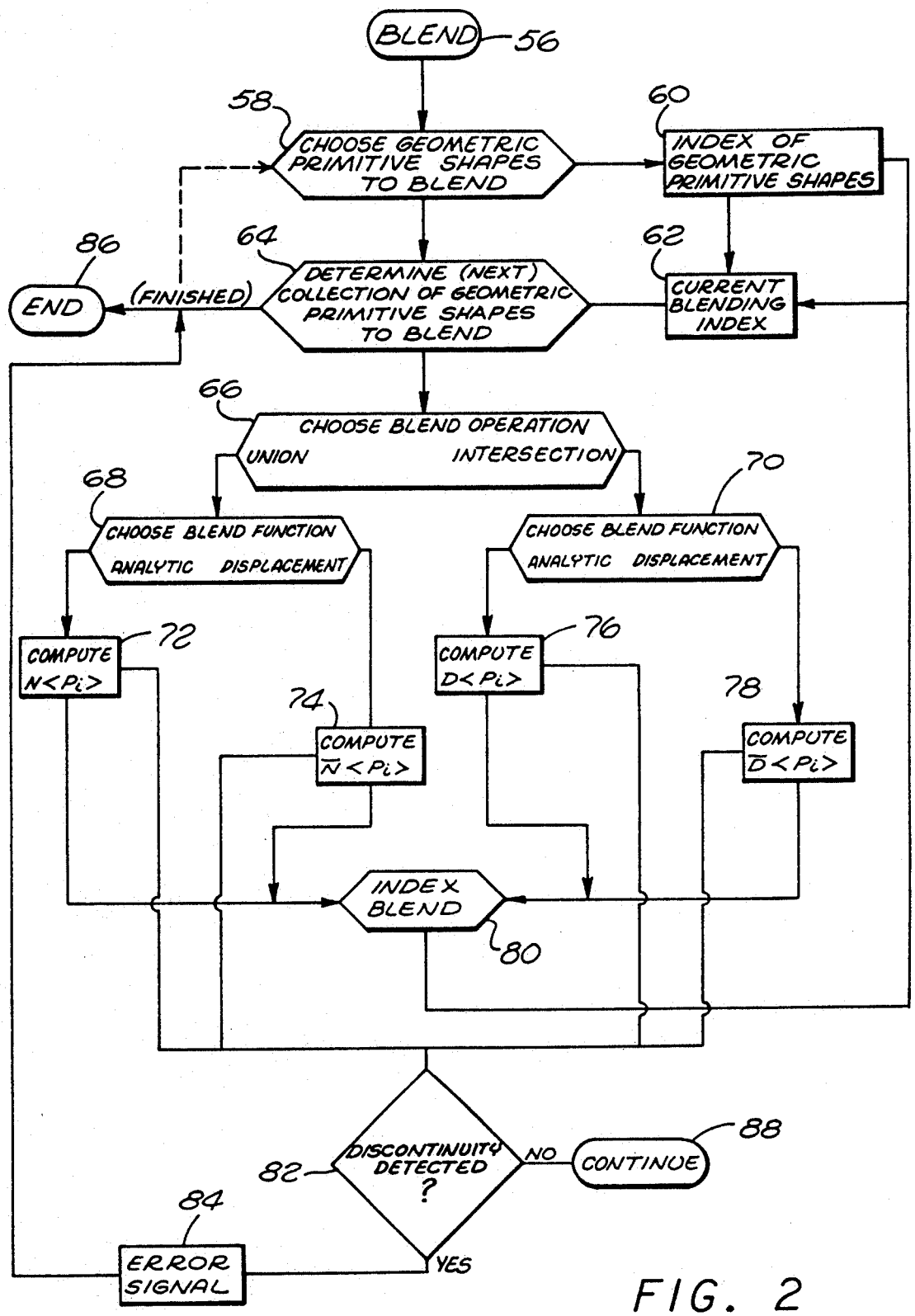
FIG. 2 is a flow diagram of the system in accordance with the present invention.

Referring to FIG. 2 a flowchart showing the operation of the blend processor 32 (FIG. 1) is illustrated. The procedure for blending surfaces utilizing the blend processor 32 (FIG. 1) is initiated by a command illustrated in box 56 as "BLEND". The next step of the process shown in box 58 is for the user to select the geometric primitive shapes to blend. Accordingly, the index of geometric primitive shapes 60 is accessed and the selected geometric primitive shapes are loaded into the current blending index 62. The geometric primitive shapes in the current blending index 62 are utilized to determine the next collection of geometric primitive shapes to blend as shown in box 64. In this regard, the geometric primitive shapes are processed according to the order of primitives and the blend processor is capable of generating the blending surface among the plurality of geometric primitive shapes.

The next step shown in box 66 is for the user to determine the blend operation, for example by selecting a Boolean operation, either union or intersection, corresponding to either an added or subtracted metal blend. If the user selects union, then the next step in the process is box 68 wherein the user next selects the blend function, analytic or displacement that determines the method by which the blend will be computed. On the other hand, if the user selects the Boolean operation intersection, then the process moves to box 70 wherein the user selects the blend function, either analytic or displacement.

Based on the selections in steps 58, 66, and 68 or 70, the blending surface is generated according to these selections as shown in boxes 72, 74, 76 or 78. Once the blend has been generated, the next step as shown in box 80 is to index the blending surface in the memory 30 (FIG. 1). At this time, the blend may be indexed in either the index of primitives (box 60) or the current blending index (box 62) for use in other modeling procedures.

If, however, during the generating of a blending surface, a discontinuity is detected as shown in box 82, then an error signal (box 84) is sent and either the process is ended as shown in box 86 or it may cycle to box 58. If, on the other hand, no discontinuity is detected during the generating of the blend, then the procedure continues as shown in box 88.

The procedure ends when there is no next collection of primitives to blend. At that time the blending surface may be graphically displayed at the screen 14 (FIG. 1). Alternatively, the procedure may be ended by either the detection of an error condition as stated earlier, or by user commands. In any event, the procedure eventually ends as shown in box 86 and the finally generated blending surface is graphically displayed and/or utilized in other modeling operations.

As disclosed above, the system is capable of generating complex localized superelliptical blending surfaces that exhibit intuitive properties and are graphically displayed in relatively short computer processing time.

The logic structures incorporated into the system generate intuitive blending surfaces, that is the blending surface is predictable, it takes on a form and position expected by the user. Consequently, less time is needed for a user to attain a satisfactory result and therefore computing costs are reduced. Because the blending surface is localized, only user-selected geometric primitive shapes are blended thereby leaving other geometric primitive shapes comprising a complex geometric object substantially unaffected by the blending procedure.

As stated above, the present invention is capable of generating blends on blends. This allows the system to work with complex geometric objects such as are designed on geometric modelers which heretofore could not be blended. To this end, the system is able to index the blending surfaces it generates so that they can be used in other modeling operations as, for example, further blending or making of milling tapes of the blend or blended object for use in milling machines, or determining the weight, center of gravity, or fit of the blend or the blended object. This capability, in addition to those mentioned above, significantly expands the range of complex geometric objects that can be modeled by the system. Consequently, the usefulness of the system is substantially increased over other systems currently in use.

In view of the above description of the preferred embodiment, it will be apparent that the system of the present invention is capable of economical implementation in a variety of systems utilizing various components and structures to generate an effective, economical and rapid blending system. This may include, among other things, incorporating the blend processor 32 within the modeler 20 or incorporating the substantial portion of the present system on a chip. Further, programming of the logic structures may be generated in a wide variety of ways, each of which generates substantially the same result. Consequently, the scope of the present invention hereof is deemed to be appropriately determined by the claims as set forth below.

What is claimed is:

1. A computer-aided design system for use with an interactive terminal for generating a graphic display of a localized superelliptical blend and blends between a plurality of geometric primitive shapes, said geometric primitive shapes including bland and blends which are truncated such that only a part of said blend and blends between predetermined locations of said geometric primitive shapes is generated said system comprising:

central processing means to generate and modify said graphic display of said geometric primitive shapes at said interactive terminal; and blend processing means which comprises:

a logic structure for implementing geometric blending operations and geometric blending functions on said pixels for truncating said blend and blends to generate said localized superelliptical blend and blends for said graphic display, wherein said logic structure generates said blend and blends in accordance with an expression:

$$N<P_i> = R<P_i>\{1-(\Sigma_i Q_i)^{1/5}\}$$

where $$R<P_i> = \Sigma_i(Q_i/\Sigma_i Q_i)R_i$$

and $Q_i = [1 - P_i/R_i]^t_+$ wherein $N<P_i>$ defines said localized superelliptical blend and blends between said geometric primitive shapes, $R<P_i>$ = rescaling function corresponding to a non-Euclidean distance measure of said blend and blends from a zero surface of a selected geometric primitive shape within said blend and blends, $R_i$ = variable range defining bounds of said blend and blends, $P_i$ = implicit function defining said selected geometric primitive shape indexed by i, and t = thumbweight, a constant which determines a degree of curvature of said blend and blends, register means, operatively connected to said central processing means, for temporary storage of said geometric primitive shapes and said generated blend and blends from said blend processing means.

2. The system according to claim 1 wherein said blending processing means further comprises another logic structure generating said blend and blends in accordance with another expression:

$$\bar{N}<P_i> = \bar{R}<P_i>\{(\Sigma_i \bar{Q}_i)^{(1/t)} - 1\}$$

where $$\bar{R}<P_i> = \Sigma_i(\bar{Q}_i/\Sigma_i \bar{Q}_i)R_i$$

and $$Z_i = [1 + P_i/R_i]^t_+$$

wherein $\bar{N}<P_i>$ defines said localized superelliptical blend and blends between said geometric primitive shapes, $\bar{R}<P_i>$ = rescaling function corresponding to said non-Euclidean distance measure of said blend and blends from said zero surface of said selected geometric primitive shape within said blend and blends, $R_i$ = variable range defining said bounds of said blend and blends, $P_i$ = implicit function defining said selected geometric primitive shape indexed by i, and t = thumbweight, said constant which determines said degree of curvature of said blend and blends.

3. A computer-aided design system for use with an interactive terminal for generating a graphic display of a localized superelliptical blend and blends between a plurality of geometric primitive shapes, said geometric primitive shapes including blend and blends, comprising:

central processing means to generate and modify pixels on said graphic display of said geometric primitive shapes at said interactive terminal; and blend processing means which comprises:

a logic structure for implementing geometric blending operations and geometric blending functions on said pixels to generate said localized superelliptical blend and blends for said graphic display, wherein said logic structure generates said blend and blends in accordance with an expression:

$$\bar{N}<P_i> = \bar{R}<P_i>\{(\Sigma_i \bar{Q}_i)^{(1/t)} - 1\}$$

where $$\bar{R}<P_i> = \Sigma_i(\bar{Q}_i/\Sigma_i \bar{Q}_i)R_i$$

and $$\bar{Q}_i = [1 + P_i/R_i]^t_+$$

wherein $N<P_i>$ defines said localized superelliptical blend and blends between said geometric primitive shapes, $\bar{R}<P_i>$ = rescaling function corresponding to a non-Euclidean distance measure of said blend and blends from a zero surface of a selected geometric primitive shape within said blend and blends, $R_i$ = variable range defining bounds of said blend and blends, $P_i$ = implicit function defining said selected geometric primitive shape indexed by i, and t = thumbweight, a constant which determines a degree of curvature of said blend and blends, register means, operatively connected to said central processing means, for temporary storage of said geometric primitive shapes and said generated blend and blends from said blend processing means.

4. The system according to claim 3 wherein said blending processing means further comprises another logic structure generating said blend and blends in accordance with another expression:

$$N<P_i> = R<P_i>\{1 - (\Sigma_i Q_i)^{1/t}\}$$

where $$R<P_i> = \Sigma_i(Q_i/\Sigma_i Q_i)R_i$$

and $$Q_i = [1 - P_i/R_i]^t_+$$

wherein $N<P_i>$ defines said localized superelliptical blend and blends between said geometric primitive shapes, $R<P_i>$ = rescaling function corresponding to said non-Euclidean distance measure of said blend and blends from said zero surface of said selected geometric primitive shape within said blend and blends, $R_i$ = variable range defining said bounds of said blend and blends, $P_i$ = implicit function defining said selected geometric primitive shape indexed by i, and t = thumbweight, said constant which determines said degree of curvature of said blend and blends.

5. A computer-aided design system for use with an interactive terminal for generating a graphic display of a localized superelliptical blend and blends between a plurality of geometric primitive shapes, said geometric primitive shapes including blend and blends which are truncated such that only a part of said blend and blends between predetermined locations of said geometric primitive shapes is generated, said system comprising:

central processing means to generate and modify pixels on said graphic display of said geometric primitive shapes at said interactive terminal; and blend processing means for generating said blend and blends, which blending processing means comprises:

a logic structure for implementing geometric blending operations and geometric blending functions on said pixels to generate said localized superelliptical blend and blends for said graphic display, said geometric blending operations and said geometric blending functions being determinative of blend and blends shapes, wherein said logic structure generates said blend and blends in accordance with an expression:

$$D<P_i>=h$$

where h is the root of $S<P_i-h>=0$, thus as a quantity, h has a value reducing $S<P_i-h>$ to zero, and $S<P_i-h> = 1 - \Sigma_i[1-(P_i-h)/R_i]^t_+ = 0$ wherein h is a displacement of said blend and blends from a selected geometric primitive shape $P_i$ indexed by i, $D<P_i>$ defines said localized superelliptical blend and blends between said geometric primitive shapes, $R_i$ = variable range defining bounds of said blend and blends, $P_i$ = implicit function defining said selected geometric primitive shape indexed by i, and t = thumbweight, a constant which determines a degree of curvature of said blend and blends, register means, operatively connected to said central processing means, for temporary storage of said geometric primitive shapes and said generated blend and blends from said blend processing means.

6. The system according to claim 5 wherein said blending processing means further comprises another logic structure generating said blend and blends in accordance with another expression:

$$\overline{D}<P_i>=h.$$

where h is the root of $\overline{S}<P_i-h>=0$, thus as said quantity, h has said value reducing $\overline{S}<P_i-h>$ to zero, and $\overline{S}<P_i-h> = \Sigma_i[1+(P_i-h/R_i]^t_+ - 1 = 0$ wherein h is said displacement of said blend and blends from said selected geometric primitive shape $P_i$, $\overline{D}<P_i>$ defines said localized superelliptical blend and blends between said geometric primitive shapes, $R_i$ = variable range defining said bounds of said blend and blends, $P_i$ = implicit function defining said selected geometric primitive shape indexed by i, and t = thumbweight, said constant which determines said degree of curvature of said blend and blends.

7. A computer-aided design system for use with an interactive terminal for generating a graphic display of a localized superelliptical blend and blends between a plurality of geometric primitive shapes, said geometric primitive shapes including blend and blends which are truncated such that only a part of said blend and blends between predetermined locations of said geometric primitive shapes is generated, said system comprising:

central processing means to generate and modify pixels of said graphic display of said geometric primitive shapes at said interactive terminal; and blend processing means for generating said blend and blends, which said blending processing means comprises:

a logic structure for implementing geometric blending operations and geometric blending functions on said pixels to generate said localized superelliptical blend and blends for said graphic display, said geometric blending operations and said geometric blending functions being determinative of blend and blends methods, wherein said logic structure generates said olend and blends in accordance with an expression:

$$\overline{D}<P_i>=h.$$

where h is the root of $\overline{S}<P_i-h>=0$, thus as a quantity, h has a value reducing $\overline{S}<P_i-h>$ to zero, and $S<P_i-h>=\Sigma_i[1+)P_i-h/R_i]^t_+ - 1 = 0$ wherein h is a displacement of said blend and blends from a selected geometric primitive shape $P_i$ indexed by i, $\overline{D}<P_i>$ defines said localized superelliptical blend and blends between said geometric primitive shapes, $R_i$ = variable range defining bounds of said blend and blends, $P_i$ = implicit function defining said selected geometric primitive shape indexed by i, and t = thumbweight, a constant which determines a degree of curvature of said blend and blends, register means, operatively connected to said central processing means, for temporary storage of said geometric primitive shapes and said generated blend and blends from said blend processing means.

8. The system according to claim 7 wherein said blending processing means further comprises another logic structure generating said blend and blends in accordance with another expression:

$$D<P_i>=h$$

where h is the root of $S<P_i-h>=0$, thus as said quantity, h has said value reducing $S<P_i-h>$ to zero, and $S<P_i-h> = 1 - \Sigma_i[1-(P_i-h)/R_i]^t_+ = 0$ wherein h is said displacement of said blend and blends from said selected geometric primitive shape $P_i$ indexed by i, $D<P_i>$ defines said localized superelliptical blend and blends between said geometric primitive shapes, $R_i$ = variable range defining said bounds of said blend and blends, $P_i$ = implicit function defining said selected geometric primitive shape indexed by i, and t = thumbweight, said constant which determines said degree of curvature of said blend and blends.

9. The system according to claim 1 or 3 further including a discontinuity detection means for detecting error conditions that may occur in generating said blend and blends.

10. The system according to claims 1 or 3 wherein said blending processing means further comprises a plurality of logic structures each implementing an individually distinct geometric blending logic for generating said localized superelliptical blend and blends.

11. The system according to claims 1, 3, 5 or 7 wherein said interactive terminal includes a display screen and a keyboard.

12. The system according to claims 1, 3, 5 or 7 wherein said central processing means is further in communication with a memory.

13. The system according to claims 1, 3, 5 or 7 wherein said register means are operatively connected to said central processing means by input and output busses.

14. A computer-aided design system for use with an interactive terminal for generating a graphic display of a localized superelliptical blend and blends between a plurality of geometric primitive shapes, including blend and blends, which blend and blends are truncated such that only a part of said blend and blends between predetermined locations of said plurality of geometric shapes is generated, said system comprising:

central processing means to generate and modify pixels on said graphic display of certain selected primitive geometric shapes of said plurality of geometric primitive shapes at said interactive terminal; and blend processing means for generating blending surfaces from said certain selected geometric primitive shapes, which said blending processing means comprises:

logic structures for selectively altering mass of said certain selected geometric primitive shapes and for selectively determining distances between zero surfaces of said blending surfaces and said certain selected geometric primitive shapes to generate said localized superelliptical blend and blends for said pixels of said graphic display, one of said logic structures generating said localized superelliptical blend and blends in accordance with an expression:

$$N<P_i> = R<P_i>\{1-(\Sigma_i Q_i)^{1/t}\}$$

where $$R<P_i> = \Sigma_i(Q_i/\Sigma_i Q_i)R_i$$

and $$Q_i = [1 - P_i/R_i]^t_+$$

wherein $N<P_i>$ defines said localized superelliptical blend and blends between said certain selected geometric primitive shapes, $R<P_i>$ = rescaling function corresponding to a non-Euclidean distance measure of said blend and blends from said zero surfaces of said certain selected geometric primitive shapes within said blend and blends, $R_i$ = variable range defining bounds of said blend and blends, $P_i$ = implicit function defining said certain selected geometric primitive shapes indexed by i, and t = thumbweight, a constant which determines a degree of curvature of said blend and blends, and register means, operatively connected to said central processing means for temporary storage of said geometric primitive shapes and said generated blend and blends from said blend processing means by input and output busses.

* * * * *